(12) United States Patent
Memory

(10) Patent No.: US 7,806,061 B2
(45) Date of Patent: Oct. 5, 2010

(54) AGRICULTURAL IMPLEMENT WITH DENSE PHASE PRODUCT DISPENSING AND PURGING

(75) Inventor: Russell James Memory, Saskatoon (CA)

(73) Assignee: CNH Canada, Ltd. (CA)

(*) Notice: Subject to any disclaimer, the term of this patent is extended or adjusted under 35 U.S.C. 154(b) by 0 days.

(21) Appl. No.: 12/271,745

(22) Filed: Nov. 14, 2008

(65) Prior Publication Data

US 2010/0122646 A1    May 20, 2010

(51) Int. Cl.
*A01C 15/00*    (2006.01)
*A01C 23/00*    (2006.01)

(52) U.S. Cl. ........................................ 111/123; 111/200

(58) Field of Classification Search .................... 111/11, 111/200, 118–120, 123, 127, 129
See application file for complete search history.

(56) References Cited

U.S. PATENT DOCUMENTS

| | | | |
|---|---|---|---|
| 524,474 A | 8/1894 | Wade |
| 670,534 A | 3/1901 | Carmical |
| 1,369,649 A | 2/1921 | Gieseler |
| 2,062,295 A | 12/1936 | Cary et al. |
| 2,171,205 A | 8/1939 | Zinke |
| 2,193,738 A | 3/1940 | Perrin |
| 2,559,183 A | 7/1951 | Barnett |
| 2,671,690 A | 3/1954 | Von Ehrenkrook |
| 2,814,531 A | 11/1957 | Murray, Jr. |
| 2,937,049 A | 5/1960 | Osawa |
| 3,197,261 A | 7/1965 | Kauffman |
| 3,207,560 A | 9/1965 | Brown |
| 3,376,897 A | 4/1968 | Dolder et al. |
| 3,386,474 A | 6/1968 | Kimmel |
| 3,387,895 A | 6/1968 | Hochmuth et al. |
| 3,515,315 A | 6/1970 | Kidd |
| 3,543,704 A | 12/1970 | Hansen |
| 3,548,765 A | 12/1970 | Grataloup |
| 4,036,408 A | 7/1977 | Dugge |
| 4,082,364 A | 4/1978 | Krambrock |
| 4,200,412 A | 4/1980 | Steele |
| 4,244,522 A | 1/1981 | Hartwig |
| 4,264,243 A | 4/1981 | Bentzen-Bilkvist |
| 4,280,419 A | 7/1981 | Fischer |

(Continued)

FOREIGN PATENT DOCUMENTS

BR    9501580-9 A    11/1995

(Continued)

*Primary Examiner*—Christopher J. Novosad
(74) *Attorney, Agent, or Firm*—Rebecca Henkel

(57) ABSTRACT

A dense phase flow product delivery system for an agricultural implement is provided. The system comprises a primary container configured to accommodate dispensed product and that includes a product exit. The system also comprises a pressure supply assembly configured to provide a pressurized fluid to the primary container and a delivery conduit connected to the product exit and configured to permit the dispensed product to pass there through. The system further comprises a purge supply configured to provide a purge fluid to the delivery conduit. The system is configured for a dispensing operation in which the pressurized fluid forces the dispensed product in the primary container to flow through the delivery conduit in a delivery direction. The system is also configured for a purging operation in which the purge fluid forces residual product in the delivery conduit to flow in a direction opposite the delivery direction.

9 Claims, 3 Drawing Sheets

U.S. PATENT DOCUMENTS

| | | | |
|---|---|---|---|
| 4,379,664 A | 4/1983 | Klein et al. |
| 4,413,935 A | 11/1983 | Smith et al. |
| 4,506,704 A | 3/1985 | Boom et al. |
| 4,553,882 A | 11/1985 | Knappertz |
| 4,562,779 A | 1/1986 | Briggs |
| 4,674,922 A | 6/1987 | Federhen et al. |
| 4,738,770 A | 4/1988 | Hastings et al. |
| 4,779,765 A | 10/1988 | Neumeyer |
| 4,793,743 A | 12/1988 | Grodecki et al. |
| 4,843,983 A | 7/1989 | Olson |
| 4,872,785 A | 10/1989 | Schrage et al. |
| 5,033,914 A | 7/1991 | Wuertele et al. |
| 5,069,583 A | 12/1991 | Caldwell |
| 5,156,102 A | 10/1992 | Andersen |
| 5,161,473 A | 11/1992 | Landphair et al. |
| 5,240,355 A | 8/1993 | Hudalla |
| 5,379,706 A | 1/1995 | Gage et al. |
| 5,392,722 A | 2/1995 | Snipes et al. |
| 5,407,305 A | 4/1995 | Wallace |
| 5,494,381 A | 2/1996 | Heyl et al. |
| 5,575,225 A | 11/1996 | Smith et al. |
| 5,749,682 A | 5/1998 | Epting |
| 5,813,801 A | 9/1998 | Newbolt et al. |
| 5,878,679 A | 3/1999 | Gregor et al. |
| 5,927,217 A | 7/1999 | Halford et al. |
| 6,047,652 A | 4/2000 | Prairie et al. |
| 6,216,918 B1* | 4/2001 | Saveliev et al. ............. 222/148 |
| 6,253,693 B1 | 7/2001 | Mayerle et al. |
| 6,298,797 B1 | 10/2001 | Mayerle et al. |
| 6,308,645 B1 | 10/2001 | Newkirk et al. |
| 6,308,646 B1 | 10/2001 | Luxon |
| 6,311,727 B1 | 11/2001 | Campau |
| 6,343,896 B1 | 2/2002 | Goodier et al. |
| 6,499,413 B2 | 12/2002 | Kleinknecht et al. |
| 6,505,569 B1 | 1/2003 | Richard |
| 6,581,532 B1 | 6/2003 | Hagen et al. |
| 6,584,919 B2 | 7/2003 | McQuinn |
| 6,644,225 B2 | 11/2003 | Keaton |
| 6,648,558 B1 | 11/2003 | Shultz |
| 6,742,464 B1 | 6/2004 | Chiu |
| 6,782,835 B2 | 8/2004 | Lee et al. |
| 6,854,405 B2 | 2/2005 | Memory |
| 6,899,042 B1 | 5/2005 | Kowalchuk |
| 6,904,851 B2 | 6/2005 | Memory |
| 6,928,938 B2 | 8/2005 | Memory |
| 6,928,939 B1 | 8/2005 | Johnson et al. |
| 6,935,254 B2 | 8/2005 | Ostrander et al. |
| 7,017,502 B2 | 3/2006 | Quam et al. |
| 7,040,242 B2 | 5/2006 | Memory |
| 7,048,475 B2 | 5/2006 | Cloue et al. |
| 7,101,120 B2 | 9/2006 | Jurkovich |
| 7,213,525 B2 | 5/2007 | Meyer et al. |
| 7,267,061 B2 | 9/2007 | Mayerle |
| 7,270,064 B2 | 9/2007 | Kjelsson et al. |
| 2006/0121403 A1* | 6/2006 | Thornton .................... 431/356 |
| 2006/0243179 A1 | 11/2006 | Landphair et al. |
| 2007/0022928 A1 | 2/2007 | Kowalchuk |
| 2007/0181048 A1 | 8/2007 | Pleyer |

FOREIGN PATENT DOCUMENTS

| | | |
|---|---|---|
| DE | 3528301 A1 | 2/1987 |
| DE | 19620016 A1 | 11/1997 |
| DE | 10006811 A1 | 1/2001 |
| EP | 0331302 A1 | 6/1989 |
| GB | 2064021 A | 6/1981 |
| GB | 2096085 A | 10/1982 |
| GB | 2222131 A | 2/1990 |
| JP | 61111227 A | 5/1986 |
| JP | 01013311 A | 1/1989 |
| JP | 06092454 A | 4/1994 |
| JP | 2003070329 A | 3/2003 |
| JP | 2003081425 A | 3/2003 |

* cited by examiner

AGRICULTURAL IMPLEMENT WITH DENSE PHASE PRODUCT DISPENSING AND PURGING

CROSS-REFERENCE TO RELATED APPLICATIONS

Not applicable.

STATEMENT REGARDING FEDERALLY SPONSORED RESEARCH OR DEVELOPMENT

Not applicable.

FIELD OF THE INVENTION

The invention relates to product delivery systems for agricultural implements, and particularly product delivery systems that dispense a product using dense phase flow and purge conduits of the system after use of the system.

BACKGROUND OF THE INVENTION

Agricultural implements, such as planters and seed dispensers, typically include a system of conduits through which a dispensed product, such as seed, is distributed. In addition, a fluid, such as pressurized air, also moves through the system of conduits to move the dispensed product to different locations on the agricultural implement. For example, some current agricultural implements include conduits through which the product is transferred from a primary container to one or more metering devices, such as singulators. However, most current designs use a large volume of fluid at low pressure to move a low volume of the dispensed product; as a result, current designs are relatively inefficient.

Moving the dispensed product with a low pressure fluid has other drawbacks in addition to low system efficiency. For example, in order to provide an adequate volume of the product to the metering devices, a relatively high air flow rate is used in which a relatively low volume of the product is transported in a high volume of the fluid, which is referred to as dilute phase flow. A high air flow rate results in high product velocity, which can in turn damage the dispensed product and the conduits of the agricultural implement. As another example, the dispensed product may become lodged in the conduits if the air velocity falls below the critical level. Most current systems do not have sufficient power to dislodge the product within the conduits. As a result, the lodged product may require manual removal by an operator which may in turn result in down-time of the agricultural implement and in some cases loss of product.

To address the drawbacks of the aforementioned systems, the inventors of the present invention designed the agricultural implement with dense phase product flow described in U.S. patent application Ser. No. 12/271,679, which is hereby incorporated by reference as if fully set forth herein. The agricultural implement with dense phase product flow advantageously provides a system in which flow of the product may be stopped without the product becoming lodged in the system conduits upon restarting flow of the product. However, some of the dispensed product remains in the system of conduits after completing a dispensing operation, and it may be wasteful to discharge the residual product by continuing the normal operation of the system. In addition, the system of conduits does not provide an adequate storage location for the dispensed product, and the dispensed product may deteriorate before a subsequent use of the agricultural implement.

Therefore, it would be desirable to have a dense phase product flow delivery system that is capable of purging the residual product in system conduits after an operation has been completed. In addition, it would also be desirable to purge the residual product in a manner such that the residual product is not wasted. Further still, it would also be desirable to purge the residual product in an efficient manner and move the product a relatively low velocity to reduce wear to the system.

SUMMARY OF THE INVENTION

In some embodiments, the present invention provides a dense phase flow product delivery system for an agricultural implement comprising a primary container configured to accommodate dispensed product and that includes a product exit. The system also comprises a pressure supply assembly configured to provide a pressurized fluid to the primary container and a delivery conduit connected to the product exit and configured to permit the dispensed product to pass there through. The system further comprises a purge supply configured to provide a purge fluid to the delivery conduit. The system is configured for a dispensing operation in which the pressurized fluid forces the dispensed product in the primary container to flow through the delivery conduit in a delivery direction. The system is also configured for a purging operation in which the purge fluid forces residual product in the delivery conduit to flow in a direction opposite the delivery direction.

In some embodiments, the purge supply is a purge conduit in fluid communication with the pressure supply assembly and the purge fluid is the pressurized fluid.

In some embodiments, the purge conduit includes a fitting for connection to a discharge end of the delivery conduit.

In some embodiments, the pressure supply assembly includes a receiver vessel and a compressor, and the receiver vessel is positioned fluidly between the compressor and the purge conduit.

In some embodiments, the purge supply is a blower assembly.

In some embodiments, the primary container includes a product return structure configured to abut the product exit when the residual product in the delivery conduit flows in the direction opposite the delivery direction.

In some embodiments, the product return structure is a generally tubular structure.

In some embodiments, the delivery conduit includes a product exit valve proximate the product exit configurable to prevent the dispensed product from passing through the product exit during the purging operation.

In some embodiments, the delivery conduit includes a purge opening configured to permit the residual product to pass there through during the purging operation.

In some embodiments, the system further comprises a discharge conduit in fluid communication with the delivery conduit configured to permit the residual product to pass there through during the purging operation.

In some embodiments, the present invention provides a dense phase flow product delivery system for an agricultural implement comprising a primary container configured to accommodate a dispensed product, and the primary container includes a primary container inlet and a product exit. The system also comprises a pressure supply assembly configured to provide a pressurized fluid, and in fluid communication with the primary container through the primary container inlet, and a delivery conduit configured to permit the dispensed product to pass there through, and the delivery conduit including a first end and a discharge end opposite the first end, and the first end being connected to the product exit. The system further includes a purge supply configured for fluid communication with the delivery conduit through the discharge end of the delivery conduit.

In some embodiments, the purge supply is a purge conduit in fluid communication with the pressure supply assembly.

In some embodiments, the purge supply is a blower assembly.

In some embodiments, the primary container includes a product return structure.

In some embodiments, the product return structure is a generally tubular structure.

In some embodiments, the delivery conduit includes a product exit valve proximate the first end.

In some embodiments, the delivery conduit includes a purge opening connected to the delivery conduit between the product exit valve and the discharge end.

In some embodiments, the system further comprises a discharge conduit in fluid communication with the delivery conduit.

In some embodiments, the present invention provides a method of operating a product delivery system of an agricultural implement, comprising the steps of: supplying a pressurized fluid to the delivery conduit to effect dense phase flow of a dispensed product in a delivery direction proceeding from a first end of the delivery conduit to a discharge end of the delivery conduit; and supplying a purge fluid at a discharge end of the delivery conduit to effect flow of residual product in a direction opposite the delivery direction.

In some embodiments, the residual product flows in the direction opposite the delivery direction by dense phase flow.

In some embodiments, the method further comprises the step of returning the residual product to a primary container.

In some embodiments, the primary container is at atmospheric pressure when the residual product is returned to the primary container.

In some embodiments, the method further comprises the step of returning the residual product to the primary container through a product return structure within the primary container.

In some embodiments, the method further comprises the step of moving the product return structure into contact with a product exit of the primary container.

In some embodiments, the purge fluid is first supplied to the delivery conduit by a pressure supply assembly through a purge conduit, and the purge fluid is then supplied to the delivery conduit by a blower assembly.

In some embodiments, the method further comprises the step of moving the residual product through a discharge conduit in fluid communication with the delivery conduit.

In some embodiments, the method further comprises the step of emptying the dispensed product from a primary container through the discharge conduit.

The foregoing and other objects and advantages of the invention will appear in the detailed description that follows. In the description, reference is made to the accompanying drawings that illustrate a preferred embodiment of the invention.

BRIEF DESCRIPTION OF THE DRAWINGS

The invention will hereafter be described with reference to the accompanying drawings, wherein like reference numerals denote like elements, and.

DETAILED DESCRIPTION OF THE PREFERRED EMBODIMENT

The following applications, each having a filing date of Nov. 14, 2008, are hereby incorporated by reference as if fully set forth herein: U.S. application Ser. No. 12/271,618 ("Sectional Distribution of Granular Product"); U.S. application Ser. No. 12/271,679 ("Agricultural Implement with Dense Phase Product Flow from a Primary Container"); U.S. application Ser. No. 12/271,723 ("Device and Method for Dense Phase Transport of Seed"); U.S. application Ser. No. 12/271,765 ("Valve and Method for Dense Phase Flow Control"); U.S. application Ser. No. 12/271,787 ("Dense Phase Distribution Branch"); U.S. application Ser. No. 12/271,808 ("Pressure Supply Assembly for an Agricultural Implement with Dense Phase Product Flow"); U.S. application Ser. No. 12/271,816 ("Dense Phase Induction System and Method"); and U.S. application Ser. No. 12/271,822 ("Granular Containment Assembly and Method").

Figure 1:
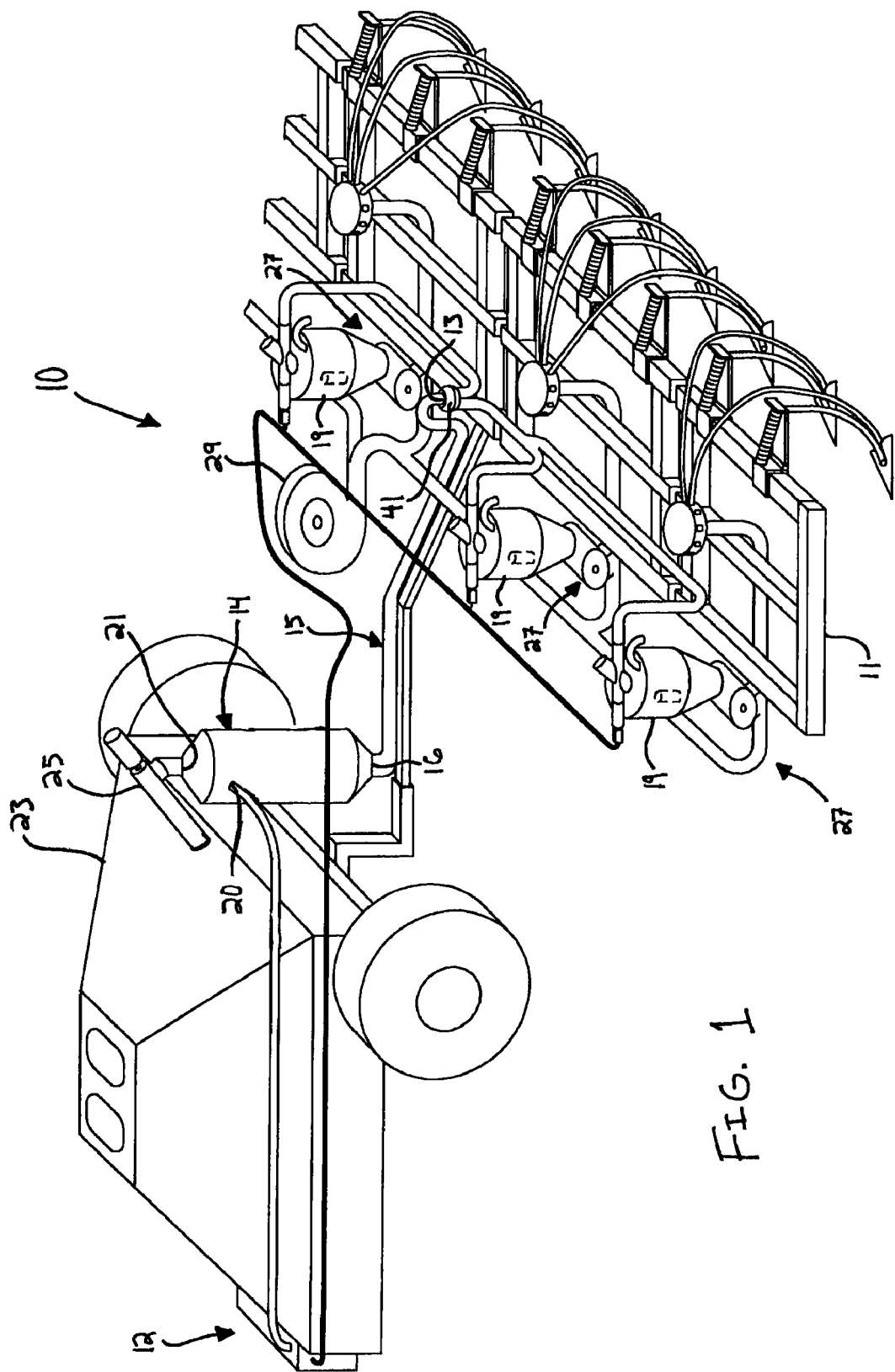
FIG. 1 is a perspective view of an agricultural implement including a product delivery system for distributing a dispensed product to various locations on the agricultural implement according to the present invention.
Figure 2:
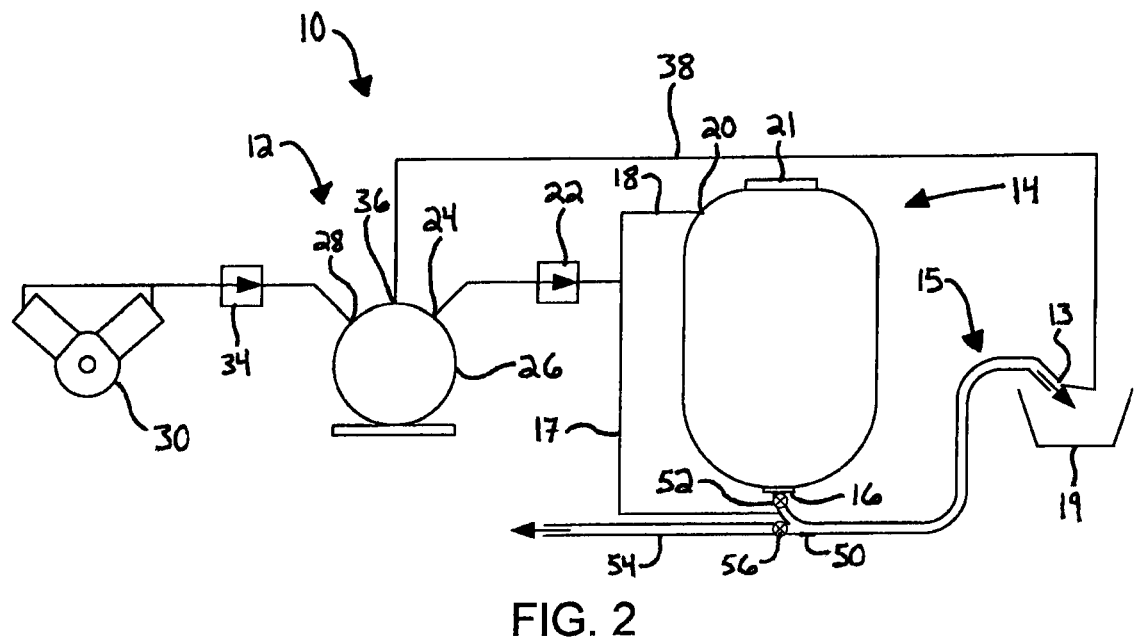
FIG. 2 is a schematic representation of the product delivery system of the present invention illustrating a purge conduit.
Figure 3:
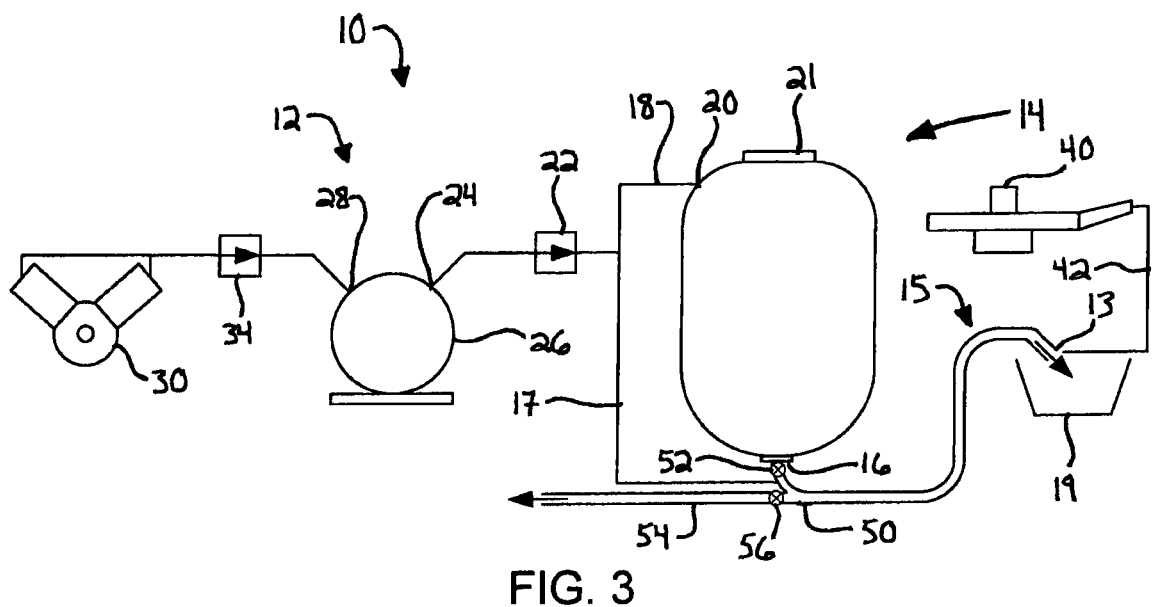
FIG. 3 is schematic representation of the product delivery system of the present invention illustrating a blower assembly.

Referring to FIG. 1, the present invention provides a product delivery system 10 positioned on a frame 11 of an agricultural implement. The agricultural implement may be an air seeder, as shown in FIG. 1, or another type of agricultural implement, such as a planter or the like. Referring to FIGS. 1-3, the product delivery system 10 includes a pressure supply assembly 12 that is in fluid communication with a primary container 14 and a delivery conduit 15. The system 10 also includes a purge supply or components for purging the system 10 of residual product. Generally in a dispensing operation, the primary container 14 accommodates a dispensed product before a pressurized fluid from the pressure supply assembly 12 and/or gravity forces the product through a product exit 16 of the primary container 14. The product flows in a delivery direction proceeding from a first end of the delivery conduit 15 to a discharge end 13 of the delivery conduit 15 after exiting the primary container 14.

Generally, the primary container 14 includes the product exit 16 and a primary container inlet 20 for fluid communication with the delivery conduit 15 and the pressure supply assembly 12, respectively, and a hatch 21 through which the dispensed product may be added to the primary container 14. The primary container 14 is an otherwise sealed container to prevent the pressurized fluid from leaking to the outside environment. In some embodiments, the primary container inlet 20 is near an end of the primary container 14 opposite the product exit 16. In the context of the primary container 14, the term 'opposite' should be understood to mean that the primary container inlet 20 and the product exit 16 are non-adjacent, and the primary container inlet 20 is spaced apart from an upper surface of the product when the primary container 14 is filled with the product. A conventional hopper (not shown) may be positioned adjacent the hatch 21 to supply the product to the primary container 14 before sealing the hatch

21. Additionally, and referring to FIG. 1, a product tank 23 may supply the product to the primary container 14 through an auger assembly 25 and the hatch 21. The primary container 14 may be oriented vertically to aid flow of the product into the delivery conduit 15, although other configurations are also possible.

The pressure supply assembly 12 includes a pressure source 30 that supplies the pressurized fluid to a receiver vessel 26 that stores the pressurized fluid. The pressure supply assembly 12 also includes a container inlet conduit 18 that is in fluid communication with the primary container inlet 20. The container inlet conduit 18 may be in fluid communication with a container bypass conduit 17 that connects to the delivery conduit 15. The container bypass conduit 17 may aid flow of the product within the delivery conduit 15. The container inlet conduit 18 may be in fluid communication with an inlet regulator 22 that is configured to adjust the pressure of the fluid entering the primary container 14. The inlet regulator 22 may also be in fluid communication with an outlet 24 of the receiver vessel 26. The receiver vessel 26 also includes a receiver vessel inlet 28 that is in fluid communication with the pressure source 30. The pressure source 30 may be a compressor in fluid communication with the receiver vessel 26 through a compressor regulator 34. The pressure source 30 is advantageously designed or selected such that it can provide the pressurized fluid at a low pressure. Some jurisdictions do not require certification of reservoirs/containers that operate at low pressures, for example, 1 bar, and as a result, the overall cost of the system 10 may be advantageously reduced. Those skilled in the art will also recognize that other components may be removed from the pressure supply assembly 12, such as the receiver vessel 26 and the regulators 22 and 34, to lower the cost of the system 10.

Referring to FIGS. 2 and 3, in general, the delivery conduit 15 includes the first end that connects to the product exit 16 and the discharge end 13 that may discharge product into a secondary containment 19, which may be a reservoir of a product metering system (not shown). Metering systems, for example, low pressure and vacuum metering systems, are well known in the art. Other components of the system 10 in which the delivery conduit 15 may be in fluid communication are described in further detail below. The delivery conduit 15 is advantageously sized for the required capacity and selected operating pressure, and may have, for example, a diameter of 2 inches. Some jurisdictions do not require certification of conduits depending on their size and the pressure of the fluid passing there through, and as a result, the overall cost of the system 10 may be advantageously reduced. The delivery conduit 15 may have a constant diameter or the diameter may increase somewhat from the first end to the discharge end 13.

The components described above advantageously provide dense phase flow of the dispensed product within the delivery conduit 15 during a dispensing operation. Dense phase flow can be described as a flow in which the product is extruded from the system 10. The leading edge of the dispensed product is moved by the pressurized fluid through the delivery conduit 15. Frontward portions of the dispensed product constantly move forward, and rearward portions of the dispensed product move forward to occupy the space vacated by the frontward portions. In addition, the product flows at relatively low velocity, for example, 1 m/s or less, in a low volume of pressurized fluid relative to the volume of the product.

Figure 5:
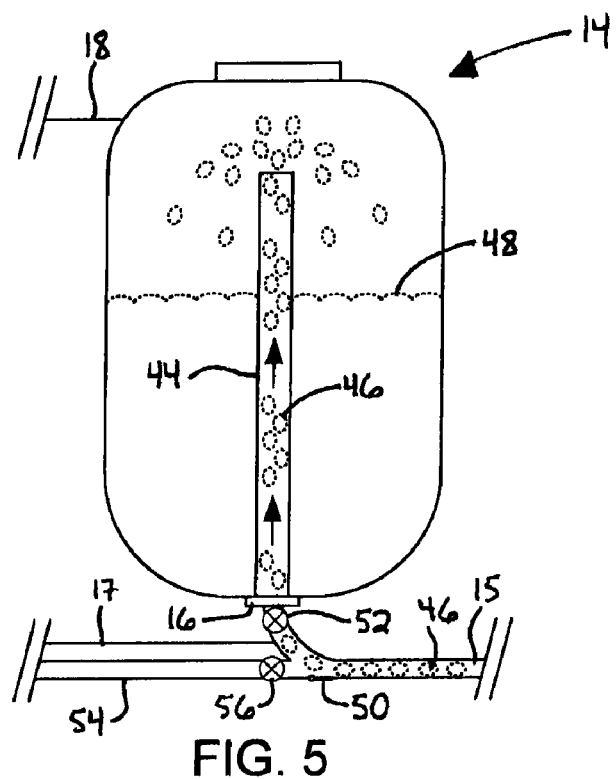
FIG. 5 is a schematic representation of the primary container illustrating the product return structure in a purging position.

As discussed briefly above, the system 10 also includes a purge supply for purging the system 10 of residual product 46 (FIG. 5). During a purging operation, the product flows in a direction opposite the delivery direction, or from the discharge end 13 of the delivery conduit 15 towards the first end. As a result, the product flows within the delivery conduit 15 to the primary container 14 or other locations. Referring specifically to FIG. 2, in some embodiments, the receiver vessel 26 may include a second outlet 36 that is in fluid communication with a purge conduit 38. Alternatively, the purge conduit 38 may be connected to the first outlet 24 of the receiver vessel 26 during a purging operation. In either case, the purge conduit 38 supplies the pressurized fluid from the pressure supply assembly 12 as a purge fluid to the delivery conduit 15 to effect flow of the residual product 46 towards the primary container 14. Specifically, the purge conduit 38 may be a relatively inexpensive flexible hose that has a fitting to connect to and seal with the discharge end 13 of the delivery conduit 15 during a purging operation. Use of the purge conduit 38 advantageously provides dense phase flow of the residual product within the delivery conduit 15 during a purging operation. However, a small amount of the residual product 46 may remain in the delivery conduit 15 after use of the purge conduit 38.

Referring now to FIG. 3, in addition to or as an alternative to the purge conduit 38, the system 10 may include a blower assembly 40 that is in fluid communication with a purge conduit 42. The purge conduit 42 supplies the pressurized fluid from the blower assembly 40 to the delivery conduit 15 to effect flow of the residual product in the delivery conduit 15 towards the primary container 14. Like the previous embodiments that include the purge conduit 38, the purge conduit 42 may be a relatively inexpensive flexible hose that has a fitting to connect to and seal with the discharge end 13 of the delivery conduit 15 during a purging operation. In addition, the blower assembly 40 may be advantageously used to purge any of the residual product 46 remaining in the delivery conduit 15 after use of the purge conduit 38.

The primary container 14 may be at atmospheric pressure during a purging operation, for example, by opening the hatch 21, when using either the purge conduit 38 or the blower assembly 40 so that pressure within the primary container 14 does not increase. An increase of pressure within the primary container 14 would result in a balance of pressure between the delivery conduit 15 and the primary container 14, thereby preventing flow of the residual product 46 during the purging operation.

Referring to FIG. 1, the discharge end 13 of the delivery conduit 15 may connect to a branch coupling 41 that connects to a plurality of product metering systems 27. The product metering systems 27 may be in fluid communication with the pressure supply assembly 12 or a blower assembly 29 for product metering. If a blower assembly 29 is used, the product may be moved by dilute phase flow after metering. Further still, the blower assembly 29 may be used as the blower assembly 40 during a purging operation by disconnecting the product metering systems 27 and connecting the delivery conduit 15 to the blower assembly 29. Additionally, during a purging operation, the branch coupling 41 may be disconnected from the plurality of product metering systems 27 and connected to one of the purge conduits 38 or 42 to move the residual product 46 in the direction opposite the delivery direction.

Figure 4:
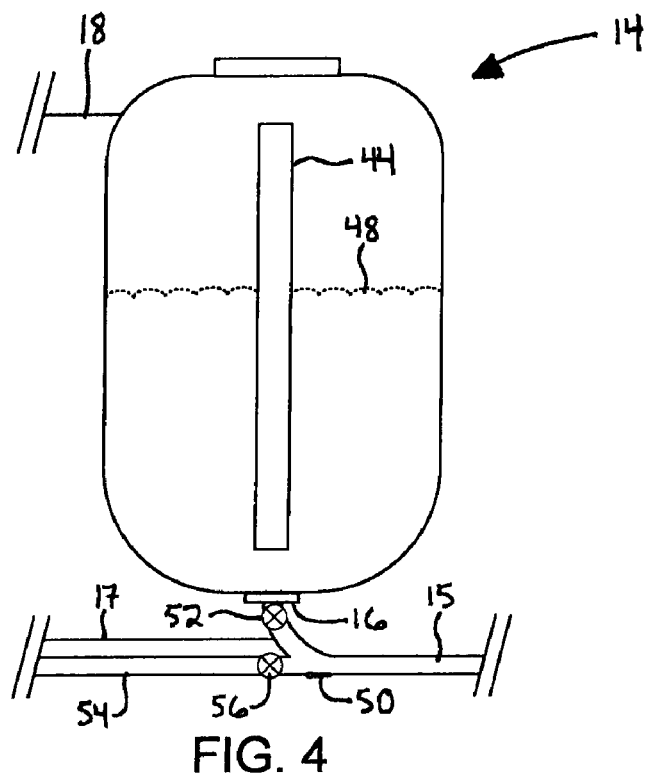
FIG. 4 is a schematic representation of a primary container of the system illustrating a product return structure in a dispensing position.

Referring now to FIGS. 4 and 5, in some embodiments, the primary container 14 includes a product return structure 44 through which the residual product 46 is returned to the primary container 14 during a purging operation. The product return structure 44, if included, may be oriented vertically or at an angle. In addition, the product return structure 44 may be a generally tubular structure with a cross-sectional area similar to that of the delivery conduit 15 to effectively return the residual product 46 to the primary container 14. The pressurized fluid forces residual product 46 upwards through the product return structure 44 and above an upper surface 48 of the product during a purging operation. As a result, the residual product 46 advantageously does not displace the product already inside the primary container 14, and therefore, the pressure requirements for a purging operating are no greater than the pressure requirements for a dispensing operation.

The product return structure 44 forms a seal against the product exit 16 to essentially provide a continuation of the delivery conduit 15 into the primary container 14. The seal prevents the pressurized fluid from dispersing within the primary container 14 and permits the purge fluid to effect flow of the residual product 46. In addition, the product return structure 44 advantageously allows the product to efficiently pass through the product exit 16 and into the delivery conduit 15 during a dispensing operation. The system 10 may permit the product to pass through the product exit 16, for example, by a translatable connection of the product return structure 44 to the primary container 14 with a linear actuator (not shown). As a result, the product return structure 44 moves between a dispensing position (FIG. 4) and a purging position (FIG. 5).

Referring to FIGS. 2-5, in some embodiments, the residual product 46 flows to a location other than the primary container 14 during a purging operation. For example, the delivery conduit 15 may include a purge opening 50 to discharge the residual product 46 from the system 10. The purge opening 50 may open to the outside environment and/or a container for collection of the residual product 46. The delivery conduit 15 also advantageously includes a product exit valve 52 that is operable to prevent the product in the primary container 14 from passing through the purge opening 50. However, it may be desirable to empty the primary container 14 through the purge opening 50 in some situations, such as after a planting operation. If the primary container 14 is to be emptied through the purge opening 50, the primary container 14 should be at atmospheric pressure, and the purge opening 50 should be positioned such that the dispensed product in the primary container 14 passes through the purge opening 50 due to gravity. Otherwise, the purge fluid may disperse within the primary container 14 without effecting flow of the residual product 46 in the delivery conduit 15.

Still referring to FIGS. 2-5, in some embodiments, a discharge conduit 54 may be in fluid communication with the delivery conduit 15 through a discharge conduit valve 56. The discharge conduit 54 may discharge residual product 46 to a container or a separate vehicle. The discharge conduit valve 56 is operable to prevent product from entering the discharge conduit 54 during a dispensing operation and permit residual product 46 to pass through the discharge conduit 54 during a purging operation. As described above, the product exit valve 52 is operable to prevent the product in the primary container 14 from entering the discharge conduit 54 during a purging operation. However, it may be desirable to permit the product in the primary container 14 to pass through the discharge conduit 54 in some situations, such as after a planting operation.

The embodiments described above advantageously provide dense phase flow of the residual product within the delivery conduit 15 during a purging operation. The low flow rate provided by dense phase flow advantageously reduces damage to the residual product and wear of the components of the system 10. The product flow rate may increase rapidly if pressure in the delivery conduit 15 rapidly fluctuates during a purging operation, but such a high flow rate will only occur briefly and will not be detrimental to the components of the system 10.

The present invention advantageously provides an efficient system in which residual product may be conveniently purged without causing damage to the product or wear of the components of the system. The present invention also advantageously permits reuse of the residual product by moving the residual product to the primary container or another appropriate location.

It is specifically intended that the present invention not be limited to the embodiments and illustrations contained herein, but include modified forms of those embodiments including portions of the embodiments and combinations of elements of different embodiments as come within the scope of the following claims.

I claim:

1. A dense phase flow product delivery system for an agricultural implement, comprising:
    a primary container configured to accommodate dispensed product and including a product exit;
    a hatch mounted on the primary container; wherein dispensed product may be added to the primary container;
    an auger assembly mounted to the hatch;
    a pressure supply assembly configured to provide a pressurized fluid to the primary container;
    a delivery conduit connected to the product exit and configured to permit the dispensed product to pass there through;
    a purge supply configured to provide a purge fluid to the delivery conduit; wherein the purge supply is a blower assembly; and
    wherein the system is configured for a dispensing operation in which the pressurized fluid forces the dispensed product in the primary container to flow through the delivery conduit in a delivery direction and the system is configured for a purging operation in which the purge fluid forces residual product in the delivery conduit to flow in a direction opposite the delivery direction.

2. The system of claim 1, wherein the purge supply is a purge conduit in fluid communication with the pressure supply assembly and the purge fluid is the pressurized fluid.

3. The system of claim 2, wherein the pressure supply assembly includes a receiver vessel and a compressor, and the receiver vessel is positioned fluidly between the compressor and the purge conduit.

4. The system of claim 1, wherein the purge conduit includes a fitting for connection to a discharge end of the delivery conduit.

5. The system of claim 1, wherein the primary container includes a product return structure configured to abut the product exit when the residual product in the delivery conduit flows in the direction opposite the delivery direction.

6. The system of claim 5, wherein the product return structure is a generally tubular structure.

7. The system of claim 1, wherein the delivery conduit includes a product exit valve proximate the product exit configurable to prevent the dispensed product from passing through the product exit during the purging operation.

8. The system of claim 7, wherein the delivery conduit includes a purge opening configured to permit the residual product to pass there through during the purging operation.

9. The system of claim 7, further comprising a discharge conduit in fluid communication with the delivery conduit configured to permit the residual product to pass there through during the purging operation.

* * * * *